United States Patent [19]
Pater

[11] Patent Number: 5,149,746
[45] Date of Patent: Sep. 22, 1992

[54] SEMI-INTERPENETRATING POLYMER NETWORK FOR TOUGHER AND MORE MICROCRACKING RESISTANT HIGH TEMPERATURE POLYMERS

[75] Inventor: Ruth H. Pater, Tabb, Va.

[73] Assignee: The United States of America as represented by The National Aeronautics and Space Administration, Washington, D.C.

[21] Appl. No.: 665,371

[22] Filed: Mar. 6, 1991

Related U.S. Application Data

[62] Division of Ser. No. 301,925, Jan. 26, 1989, Pat. No. 5,098,961.

[51] Int. Cl.$^5$ .............................................. C08L 79/08
[52] U.S. Cl. ..................................... 525/422; 525/432; 525/903
[58] Field of Search ....................... 525/422, 432, 903

[56] References Cited

U.S. PATENT DOCUMENTS

| | | | |
|---|---|---|---|
| 4,695,602 | 9/1987 | Crosby et al. | 525/422 |
| 4,695,610 | 9/1987 | Egli et al. | 525/432 |
| 4,847,333 | 7/1989 | Lubowitz et al. | 525/432 |
| 4,981,922 | 1/1991 | Sheppard et al. | 525/432 |
| 4,996,101 | 2/1991 | Landis et al. | 525/432 |

Primary Examiner—James J. Seidleck
Assistant Examiner—Vasu S. Jagannathan
Attorney, Agent, or Firm—George F. Helfrich

[57] ABSTRACT

This invention is a process for making a semi-interpenetrating polymer network which includes a high performance thermosetting polyimide having a nadic end group acting as a crosslinking site and a high performance linear thermoplastic polyimide having the following repeating unit:

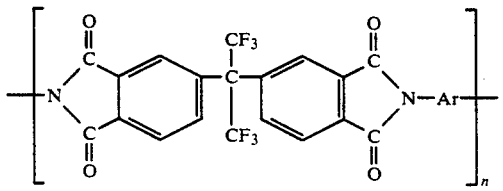

Provided is an improved high temperature matrix resin which is capable of performing at 316° C. in air for several hundreds of hours. This resin has significantly improved toughness and microcracking resistance, excellent processability and mechanical performance, and cost effectiveness.

4 Claims, 1 Drawing Sheet

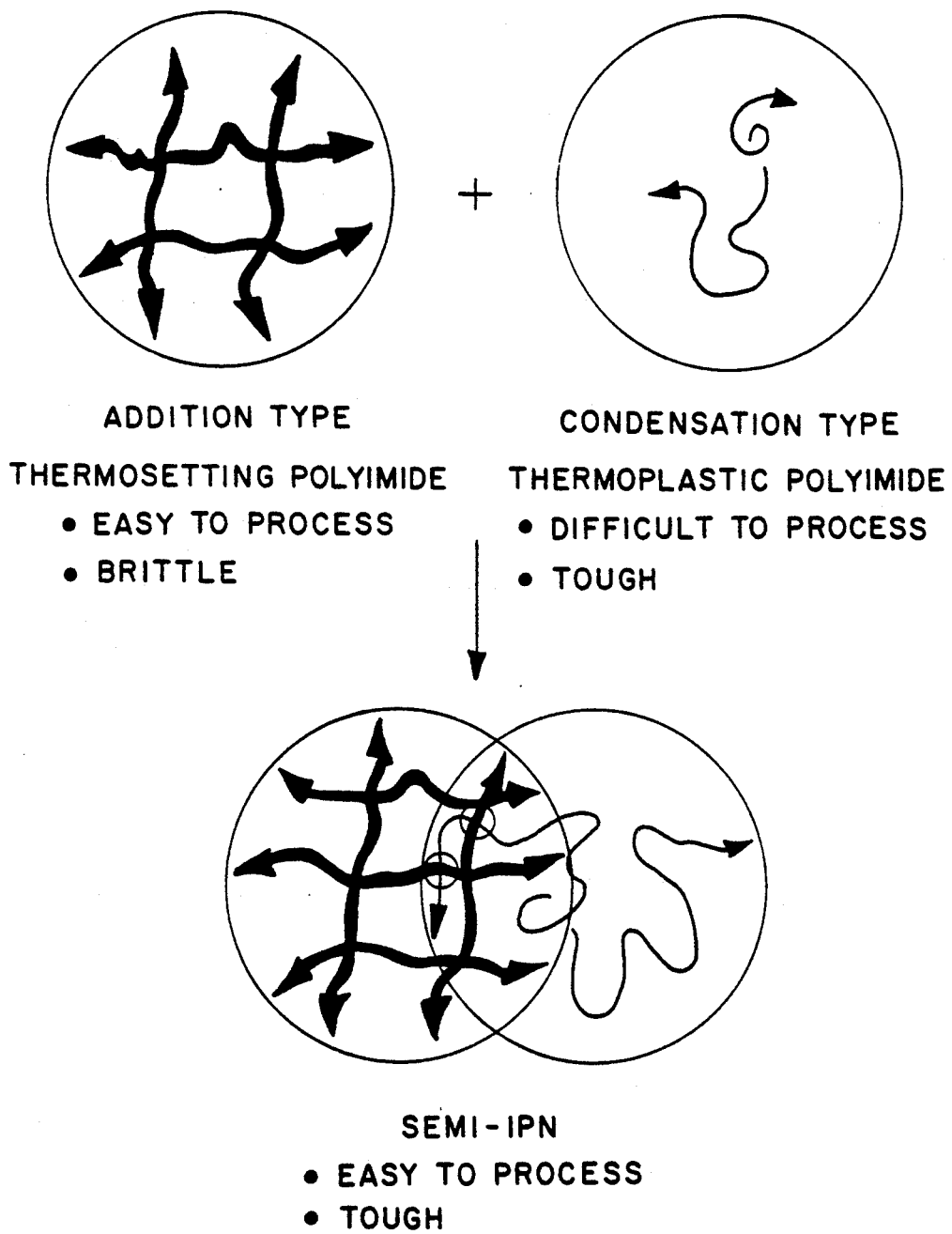

SEMI-INTERPENETRATING POLYMER NETWORK FOR TOUGHER AND MORE MICROCRACKING RESISTANT HIGH TEMPERATURE POLYMERS

ORIGIN OF THE INVENTION

The invention described herein was made by an employee of the U.S. Government and may be manufactured and used by or for the Government for governmental purposes without the payment of any royalties thereon or therefor.

This is a divisional of copending application Ser. No. 07/301,925 filed on Jan. 26, 1989 now U.S. Pat. No. 5,098,961.

BACKGROUND OF THE INVENTION

1. Field of the Invention

The present invention relates generally to high temperature polymers. It relates particularly to a semi-interpenetrating polymer network approach to the obtainment of tougher and more microcracking resistant high temperature polymers.

2. Description of the Related Art

For some time, there has been an active search for an improved high temperature matrix resin capable of performing at 316° C. in air for several hundreds of hours. Some of the desired properties for this improved material are significantly improved toughness and microcracking resistance, excellent processing capability and mechanical performance, and cost effectiveness.

To develop such an improved material, the approach used in early studies concentrated on the synthesis of flexibilized PMR polyimides, in which flexibilizing linking groups, such as ether and/or hexafluoroisopropylidene groups, were incorporated into the PMR polymer chain. (A PMR polyimide contains a nadic end group acting as a crosslinking site, and is processed by the polymerization of monomer reactant (PMR) process as set forth in U.S. Pat. No. 3,745,149). Vannucci and Bowles (R. D. Vannucci and K. J. Bowles, Proceedings of the 17th Nat. SAMPE Technical Conference, 17 352 (1985)) reported a small increase (35 percent) in composite impact energy for the flexibilized PMR-polyimide compared to a PMR polyimide designated PMR-15. (See infra for details concerning the synthesis of PMR-15.) This improvement in toughness, however, was achieved with a compromise in lowering the glass transition temperature. Similar findings were also reported by Delvigs (P. Delvigs, Polymer Composites, 7(2), 101 (1986). These results show clearly that such an approach is not effective in providing adequate toughness for the improved material.

St. Clair et al (U.S. Pat. No. 4,695,610) and others have synthesized semi-interpenetrating network (semi-IPN) polyimides from easy-to-process, but brittle thermosetting polyimides and tough, but difficult-to-process thermoplastic polyimides. However, none of these prior art products have the desired combination of properties set forth hereinabove.

SUMMARY OF THE INVENTION

It is accordingly a primary object of the present invention to provide what the prior art has been unable to provide—viz., an improved high temperature matrix resin capable of performing at 316° C. in air for several hundreds of hours, the resin having significantly improved toughness and microcracking resistance, excellent processability and mechanical performance, and cost effectiveness.

This primary object and other objects and benefits are achieved by the provision of a semi-interpenetrating polymer network comprising a high performance thermosetting polyimide having a nadic end group acting as a crosslinking site, and a high performance linear thermoplastic polyimide having the following repeating unit:

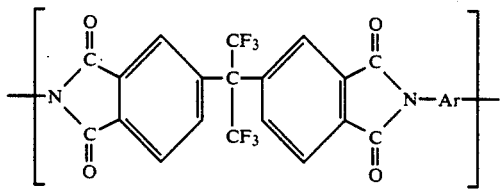

Especially beneficial results are obtained when the high performance linear thermoplastic polyimide comprises a mixture of the following compounds:

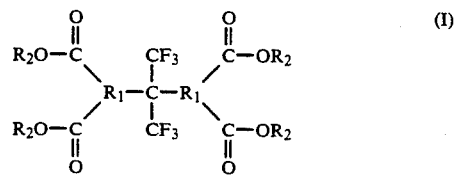 (1)

wherein $R_1$ is a trivalent aryl radical and $R_2$ is hydrogen or alkyl; and

 (2)

wherein $R_3$ is a divalent aryl radical.

Excellent results are achieved when the high performance linear thermoplastic polyimide comprises a mixture of the following compounds:

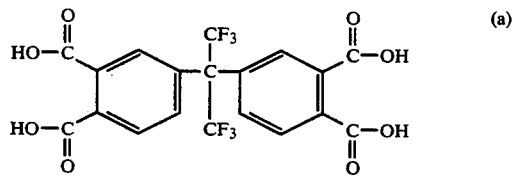 (a)

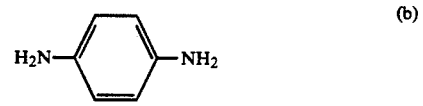 (b)

and

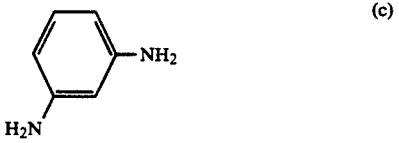 (c)

especially when compound (a) is present in a stoichiometric quantity, and the molar ratio of compound (b): compound (c) is about 95:5.

A number of additional, especially-preferred embodiments are found in the following Detailed Description of the Invention.

BRIEF DESCRIPTION OF THE DRAWING

The single FIGURE is a schematic depiction of a semi-IPN synthesis.

DESCRIPTION OF THE PREFERRED EMBODIMENTS

The concept of the high performance semi-IPN synthesis is shown in FIG. 1. One or more easy-to-process, but brittle thermosetting polyimides are combined with one or more tough, but difficult-to-process linear thermoplastic polyimides to form a semi-IPN polyimide having a combination of several desirable properties, including easy processability, damage tolerance, good mechanical performance and good thermo-oxidative stability. In the present invention, the combination of desired properties is achieved by controlling factors which include (1) careful selection of constituent polymer components, (2) composition variation of the constituent materials, (3) processing parameters and (4) thermodynamic and chemical kinetics variables to control the phase morphology and phase stability. Each of these factors is discussed in detail in the following paragraphs.

The selection of the constituent thermosetting and thermoplastic polyimides is based primarily on their processing and property compatibility. The processing parameters considered of particular importance are solubility in a common organic solvent and compatible cure cycle. Further, these polymers must have comparable glass transition temperature (±50° C.), mechanical performance and thermo-oxidative stability.

The semi-IPN of this invention comprises a PMR polyimide, which contains a nadic end group acting as a crosslinking site and is prepared by the polymerization of monomer reactant (the PMR) process as set forth in U.S. Pat. No. 3,745,149) and an NR-150B2 polyimide. The NR-150B2 polyimide precursor solution in N-methylpyrrolidone (NMP)/ethanol solvent mixture is obtained from E. I. Dupont De Demours and Company (hereafter Dupont). The polyimide precursor solutions in ethanol solvent under the trademarks NR-150B2 S2X to NR-150B2 S2X10 are also obtained from DuPont. The NR-150B2 polyimide can also be prepared as set forth in U.S. Pat. No. 3,959,350, according to the following reaction:

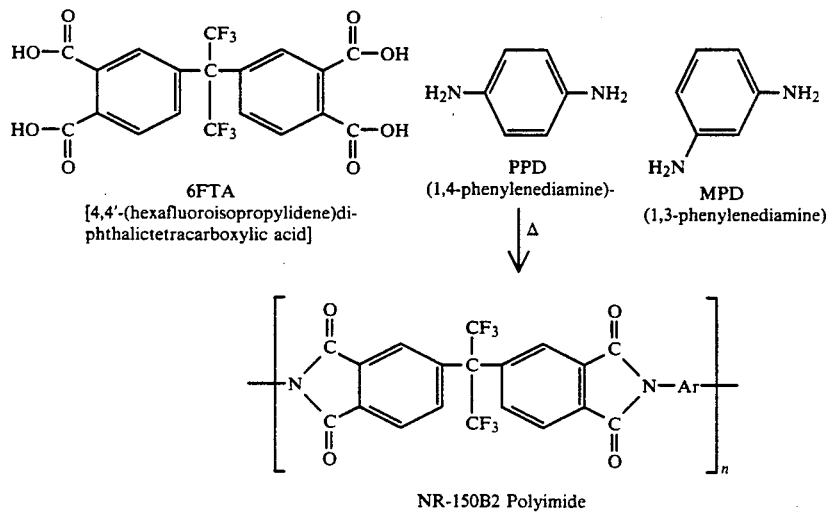

The linear thermoplastic polyimide prepared from 6FTA and an aromatic diamine or a diamine mixture comprising two or more aromatic diamines according to the following reaction equation are applicable for this invention:

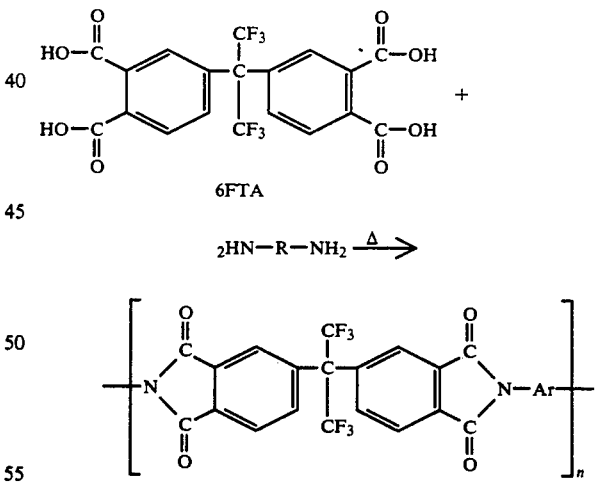

wherein R is a divalent aryl radical.

Several nadic end-capped PMR polyimides are considered compatible with NR-150B2 polyimide and, therefore, can be used in this invention. These include (1) the polyimide of U.S. Pat. No. 3,745,149, particularly preferred being the polyimide commonly known as PMR-15 which is synthesized according to the following reaction equation:

MONOMER REACTANTS

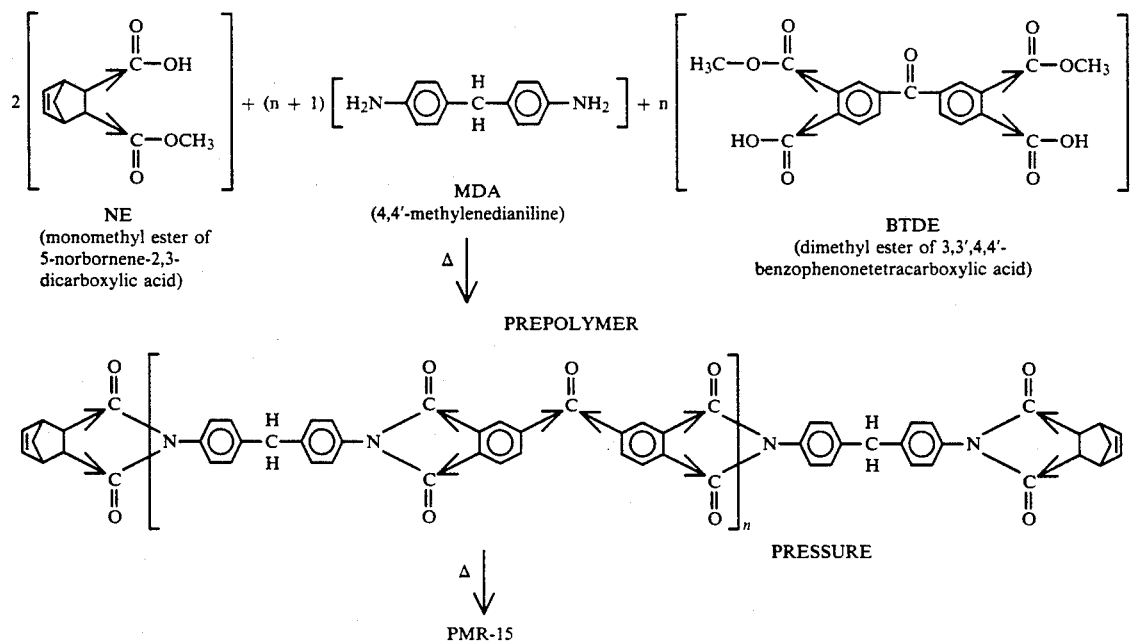
where n=2.087; (2) the polyimide of U.S. Pat. No. 4,569,988, particularly preferred being the polyimide prepared from monomer compounds having the following formulas:
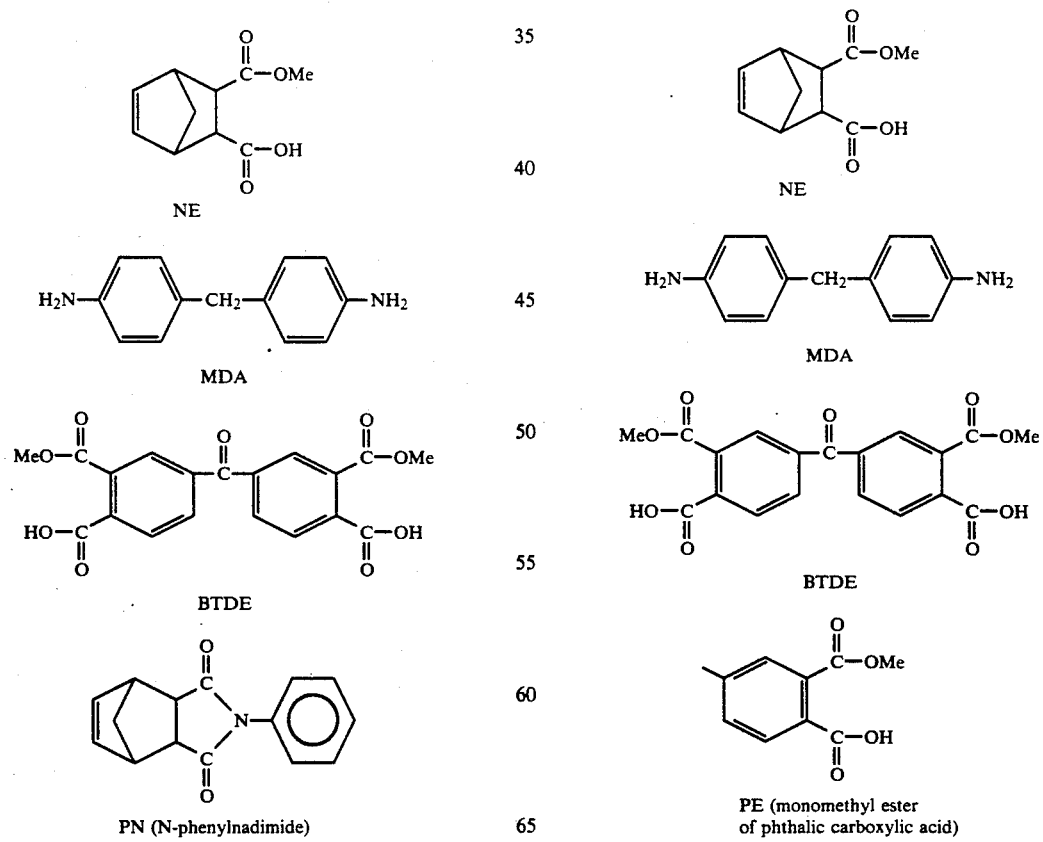
(3) the polyimide made from monomers having the following formulas:
(4) the polyimide made from monomers having the following formulas:

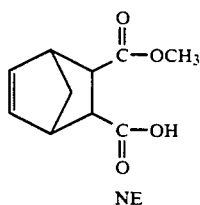

NE

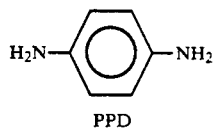

PPD

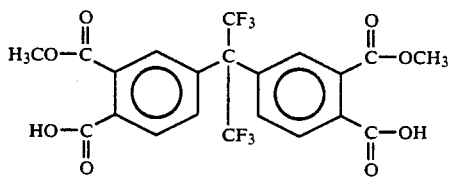

6FDE [dimethyl ester of 4,4'-(hexafluoroisopropylidene)diphthalic tetracarboxylic acid]

(5) the polyimide made from monomers having the following formulas:

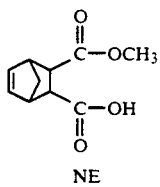

NE

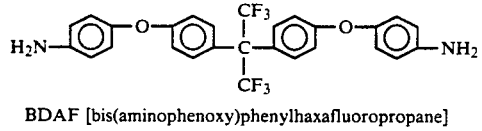

BDAF [bis(aminophenoxy)phenylhaxafluoropropane]

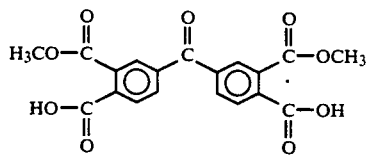

BTDE (6) the polyimide made from monomers having the following formulas:

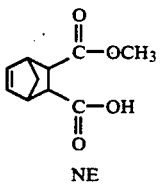

NE

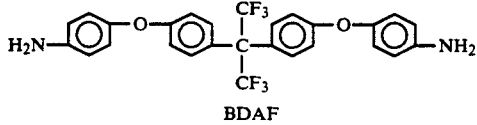

BDAF

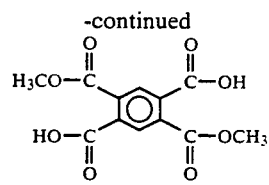

PMDA (dimethylester of 1,2,4,5-bezenetetracarboxylic acid)

and (7) the polyimide of U.S. Pat. Nos. 4,166,170 and 4,233,258, particularly preferred being the polyimide made from monomers having the following formulas:

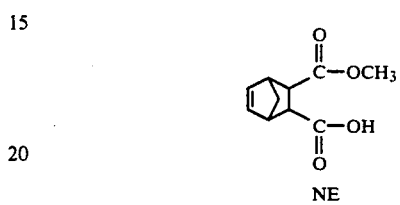

NE

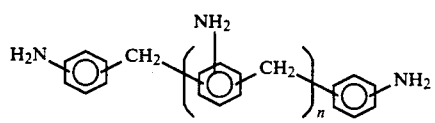

Jeffamine (a mixture of aromatic amines composed primarily of 4,4'-methylenedianiline)

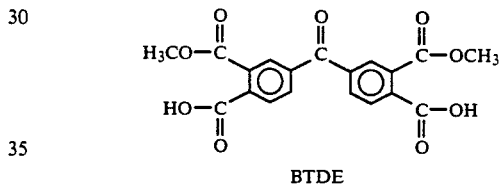

BTDE

The composition of the constituent thermosetting and thermoplastic polyimides significantly affects many aspects of the processing, properties and morphology of the semi-IPN. It has been found that increasing the concentration of the thermoset component increases the processability and performance of the semi-IPN, but at a cost of decreasing toughness characteristics. While the weight ratio of the PMR polyimide to NR-150B2 can be varied from 95:5 to 5:95, the ratio between 80:20 to 20:80 is preferred. However, the ratio of 80:20 is particularly preferred because this composition offers the best overall balance of processing, performance and cost effectiveness.

The synthesis of the present semi-IPN can proceed in two major ways: simultaneous and sequential. In the former, the uncrosslinked PMR prepolymers are combined with the monomer precursors of the NR-150B2. With application of heat, the PMR prepolymers are allowed to crosslink in the immediate presence of the NR-150B2 polyimide undergoing simultaneous linear chain extension. This synthesis can lead to a network in which one polymer interlocks with the other prepolymer, forming permanent entanglements at the interfacial regions of the two polymer systems. The resulting physical crosslinking provides synergistic properties. This synthesis is designed so that the constituent polymers are formed independently without any chemical interference between the precursors of the thermosetting and thermoplastic polyimides. The sequential method involves a process in which one polymer is synthesized and/or crosslinked in the immediate presence of the other which has been prepolymerized. There are two sequential semi-IPNs: semi-1-IPN and semi-2-IPN. The former is prepared by polymerizing a linear polymer in a crosslinked network. The reverse sequence results in a semi-2-IPN. In this invention, the simultaneous method is preferred, because it offers easier processing, better performance and less phase separation, as compared with the sequential approach. There is yet another synthetic method which is nonconventional. This method involves mixing the monomers of the thermosetting component with the monomers of the thermoplastic component and allowing the monomers to react randomly to form a simultaneous semi-IPN. The inter-reaction between monomers of the thermoset and thermoplastic occurs, which results in a semi-IPN significantly different in chemical structure and properties from those prepared by the previous methods.

The physically crosslinked semi-IPNs prepared by the simultaneous, sequential, or unconventional methods all exhibit phase separation as shown by the appearance of multiple glass transition temperatures. In order to obtain better control of the phase morphology and phase stability, and still obtain the desired properties of toughness, high glass transition temperature, and microcracking resistance, a new graft copolymer has been formed using the thermoplastic and thermoset polyimides that form the semi-IPNs of the present invention. To make this graft copolymer 0.1 to 5 weight percent of NE is added into the NR-150B2 monomer precursors. To this mixture, the uncrosslinked PMR prepolymers are added. As a result, the NR-150B2 is now lightly endcapped with a nadic group to form a nadic end-capped NR-150B2 polyimide. Through the common nadic end group, the nadic end-capped NR-150B2 is then crosslinked with the PMR polyimide to give a graft copolymer upon heating. This reaction is shown below.

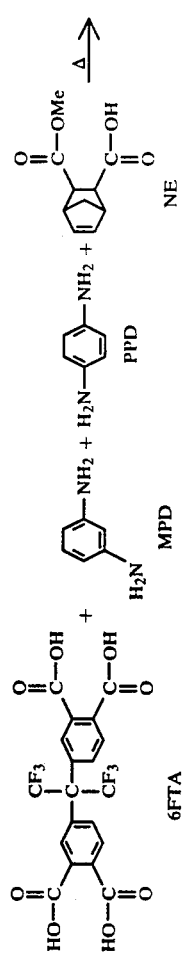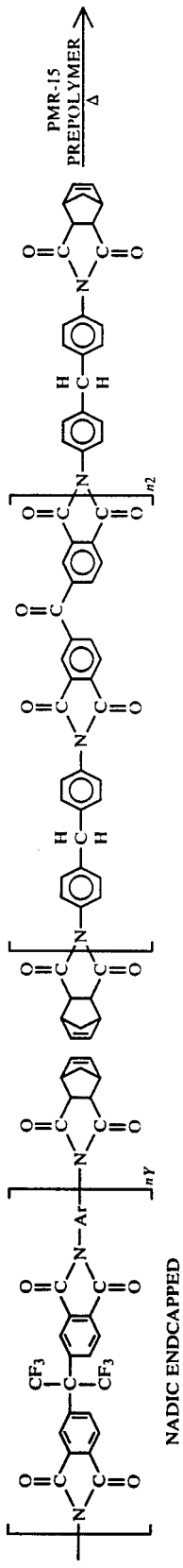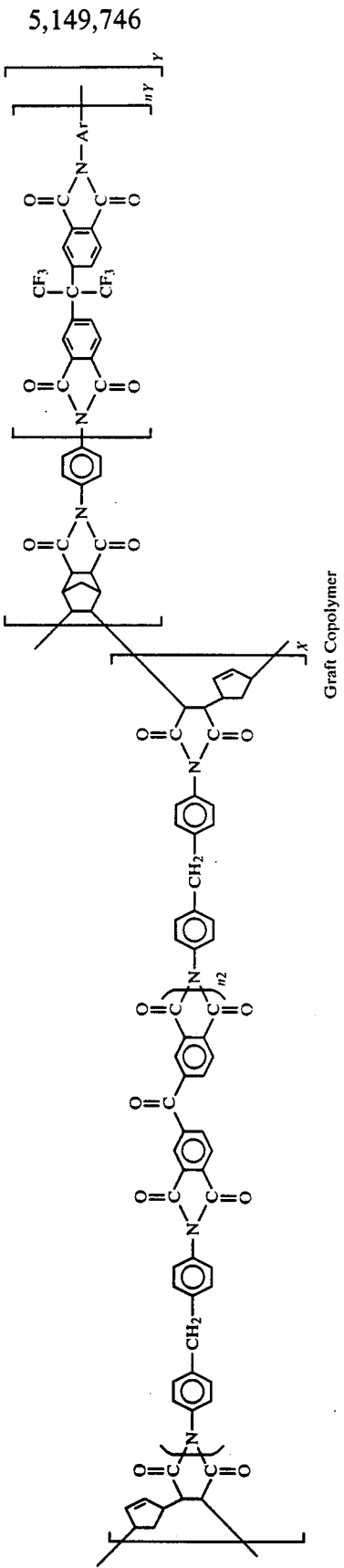

wherein $n_1 = 20$ to 55 and $n_2 = 2.087$, and wherein $X:Y = 80:20$ to $20:80$.

Because of chemical bonding between the constituent polymers, the resultant graft copolymer exhibits less phase separation and better long term phase stability, as compared with the physically crosslinked semi-IPNs prepared by the previous methods.

The semi-IPN polyimide of this invention is adapted for use as a composite matrix, and as an adhesive and molding compound suitable for aerospace and aircraft engine structural applications in the 288° C. to 316° C. temperature range.

The following are examples that illustrate preparation and use of the semi-IPNs for applications in advanced composites, structural adhesives and molding articles. However, it is to be understood that the examples are merely illustrative and intended to enable those skilled in the art to practice the invention in all of the embodiments flowing therefrom and do not in any way limit the scope of the invention as defined in the claims.

EXAMPLES

EXAMPLE 1

To 51.949 g of a 50 weight percent methanol solution of dimethyl ester of 3,3',4,4'-benzophenonetetracarboxylic acid (BTDE) (25.9 g, 0.0673 mole) was added 19.72 g (0.0996 mole) of 4,4'-methylenedianiline (MDA), 12.6 g (0.0645 mole) of monomethyl ester of 5-norbornene-2,3-dicarboxylic acid (NE) and 32.5 g of anhydrous methanol. The mixture was stirred at room temperature for one-half hour to give a 50 weight percent PMR-15 monomer solution. The solution was concentrated at 80° C. in a nitrogen atmosphere for two hours, followed by drying at 100° C. in air for two hours, and then staging at 150° C. in air for one and one-half hours to yield a brown PMR-15 molding powder. The PMR-15 molding powder was soluble in NMP (N-methylpyrrolidone) and dimethylformamide (DMF). Its DSC (differential scanning calorimetry) scan showed one endotherm at about 221° C., which is due to the melt-flow of PMR-15 molding powder. This molding powder was subsequently used for the preparation of semi-IPN molding compound LaRC-RP-40 as described below.

A solution of 14.8480 g of the PMR-15 molding powder prepared above in 40.1229 g of freshly distilled NMP was added dropwise to 6.8704 g of a commercial NR-150B2 monomer precursor solution in NMP/ethanol having a 54 percent solid content. This yielded a 30 weight percent solution in which the PMR-15 molding powder and the NR-150B2 monomer precursors were present in 80 and 20 weight percent, respectively.

To prepare a molding compound, the solution was poured into cold distilled water (1 to 5 volume ratio). This resulted in the precipitation of a gray solid. The gray solid material was then filtered, dried at 100° C. in air for two hours, and staged at 220° C. in air for one hour to afford the LaRC-RP40 molding powder. To see if interreaction occurred, the LaRC-RP40 molding powder was analyzed by DSC. The scan showed endotherms at about 220° C. and 257° C., corresponding to the PMR-15 imide prepolymer and the NR-150B2 imide oligomer, respectively. These peaks were also observed in the DSC scans of the PMR-15 imide prepolymer mentioned previously and NR-150B2 molding powder staged at 250° C. in air for one hour. The absence of any additional peaks in the DSC scan of LaRC-RP40 suggests that no interreaction between the PMR-15 and NR-150B2 reactants occurs during the preparation of LaRC-RP40 molding powder.

The LaRC-RP40 molding powder (14.59 grams) was then placed in a cold matched metal die. This was then inserted into a press preheated to 316° C. A thermocouple was attached to the die to determine the thermal history. when the die temperature reached 232° C., 2000 psi pressure was applied. The temperature was raised to 316° C. at a rate of 4° C./minute. The neat resin was cured at 316° C. in air under 2000 psi pressure for one hour and 350° C. for an additional one-half-hour under the same pressure and removed from the press when the die temperature reached 177° C. This afforded a neat resin having dimensions of 3.2 cm by 3.2 cm by 1.0 cm. The optical microscopic examination of the cross-section of the neat resin showed no detectable voids or defects. The resin was then accepted for impact tension specimen preparation without further post-curing. However, for other test specimen preparations, the cured resin was subjected to a post-curing at 316° C. for 16 hours in air. In order to compare properties, the neat resins of the constituent polymers, namely PMR-15 and NR-150B2, were also prepared following a procedure similar to the one described above for LaRC-RP40. Table 1 summarizes the neat resin properties of LaRC-RP40, and Table 2 compares LaRC-RP40 and PMR-15.

TABLE 1

| Neat Resin Properties of LaRC-RP-40 | |
|---|---|
| Physical Properties | |
| Tg (glass transition temperature) (°C., Dry)[a] | 348 and 381 |
| Tg (°C., Wet)[a] | 349 and 381 |
| Coefficient of thermal expansion ($\mu$m/m °C.)[a] | 43 at 75° C. |
|  | 43 at 220° C. |
| Density (g/cc) | 1.41 |
| Equilibrium Moisture Absorption (%)[b] | 1.0 |
| Toughness | |
| $G_{Ic}$ (critical energy release rate) $J/m^2$ (in-lbs/in$^2$)[c] | 368 (2.1) |
| Thermooxidative Stability | |
| Wt. loss after 1000 hours isothermal aging at 316° C. in air (%) | 6.0 |
| TGA (thermogravimetric analysis) temperature at 5% wt. loss (°C.) | 463 |
| Rheological Properties | |
| Molding powder minimum shear viscosity (poise)[d] | $1.7 \times 10^5$ at 240° C. |

[a]Determined by TMA (thermomechanical analysis)
[b]Specimens immersed in water at room temperature for two weeks
[c]Average of two determinations and calculated from $K_{Ic}$ (critical fracture toughness) using PMR-15 tensile modulus (RT) $5.0 \times 10^5$ psi
[d]Measured by RDS (rheometric dynamic spectroscopy)

TABLE 2

| Comparison of Properties Between LaRC-RP40 and PMR-15 | | |
|---|---|---|
| Neat Resin Property | LaRC-RP40 | PMR-15 |
| Cure temperature (°C.) | 316 | 316 |
| Tg (°C.)[a] | | |
| Dry | 348 and 381 | 339 |
| Wet | 349 and 381 | 340 |
| $G_{Ic}$, $J/m^2$ (in-lbs/in$^2$)[b] | 368 (2.1) | 87 (0.5) |
| Wt. loss after 1000 hours at 316° C. in air (%) | 6.0 | 8.0 |
| Equilibrium moisture absorption (°C.) | 1.0 | 1.6 |
| Composite Property | | |
| Cure temperature (°C.) | 316 | 316 |
| Tg, (°C.)[a] | | |
| Dry | 369 | 342 |
| Wet | 341 | 325 |
| Equilibrium moisture | 1.0 | 1.3 |

TABLE 2-continued

Comparison of Properties Between LaRC-RP40 and PMR-15

| Neat Resin Property | LaRC-RP40 | PMR-15 |
|---|---|---|
| absorption (°C.) | | |
| Flexural strength, GPa (Ksi)[d] | | |
| Room temperature as fabricated | 1840 (267) | 1846 (268) |
| 316° C. as fabricated | 1199 (174) | 1096 (159) |
| 316° C. after 1500 thermal cycles[e] | 1303 (189) | 744 (108) |
| Flexural modulus, MPa (Msi)[d] | | |
| Room temperature as fabricated | 152.3 (22.1) | 114.4 (16.6) |
| 316° C. as fabricated | 139.2 (20.2) | 90.9 (13.2) |
| 316° C. after 1500 thermal cycles[e] | 82.7 (12.0) | 79.9 (11.6) |
| Interlaminar shear strength, GPa (Ksi)[d] | | |
| Room temperature as fabricated | 97.8 (14.2) | 110.3 (16.0) |
| 316° C. as fabricated | 47.5 (6.9) | 55.1 (8.0) |
| Shear Modulus (dyne/cm$^2$)[f] | | |
| 25° C. | 8.8 E + 10 | 5.4 E + 10 |
| 316° C. | 5.5 E + 10 | 3.4 E + 10 |
| Wt. loss after 1000 hours at 316° C. in air (%)[g] | 6.0 | 5.0 |
| Microcracks after 1000 thermal cycles (cracks/inch)[e] | 0 | 58 |

[a]Determine by TMA
[b]Calculated from K$_{Ic}$ using PMR-15 tensile modulus (5.0 × 10$^5$ psi)
[c]Specimens immersed in water at room temperature for two weeks
[d]Average of three determinations
[e]Thermal cycling temperature from −156° C. to 288° C., with a total time of 15 minutes for each cycle
[f]Determine by RDS
[g]Average of five determinations

EXAMPLE 2

For advanced composite applications, approximately 44.0 g of unsized Celion 6000 graphite fibers were wound onto a drum to form a 6.25 by 60 inch dry tape. As in Example 1, a 30 weight percent resin solution in NMP was prepared by mixing 23.7 g of the PMR-15 molding powder, 10.9 g of the NR-150B2 precursor solution and 69.0 g of freshly distilled NMP. The resulting clear dark brown solution was evenly applied using a brush to the dry fiber tape to give a prepreg. By visual inspection, the prepreg showed good drape and tack characteristics. The prepreg was dried on the rotating drum at room temperature for 16 hours, removed from the drum and cut into 7.6 cm by 17.8 cm plies. Twelve plies were stacked unidirectionally and then staged at 204° C. for two hours in a air-circulating oven. The staged lay-up was placed in a cold matched metal die. This was then inserted into a preheated 316° C. press. A thermocouple was attached to the matched die to determine the temperature. When the die temperature reached 232° C., 1000 psi pressure was applied. The temperature was raised to 316° C. at a rate of 6° C./minute. The composite was cured at 316° C. for one hour, and then at 350° C. for one-half hour in air under 1000 psi pressure. When the die temperature cooled to 177° C., the composite was removed from the press. It was then postcured at 316° C. in air for 16 hours. The ultrasonic c-scan of the composite showed no detectable voids or defects, and the composite was accepted for test specimen preparation. For comparison purposes, a Celion 6000/PMR-15 composite was also fabricated using the same cure cycle, except that 500 psi pressure, instead of 1000 psi pressure, was used and the 350° C. curing step was omitted.

Table 3 shows the physical and mechanical properties of Celion 6000/LaRC-RP40. (A comparison of the composite properties of PMR-15 and LaRC-RP40 is highlighted in Table 2.)

TABLE 3

Composite Properties of Celion 6000/LaRC-RP40

| Physical Properties | |
|---|---|
| Tg (°C.) | |
| Dry | 369 |
| Wet | 341 |
| Coefficient of thermal expansion (μm/m °C.)[a] | 18 at 75° C. |
| | 16 at 225° C. |
| Density (g/cc) | 1.55 |
| Equilibrium Moisture Absorption (%)[b] | 1.0 |
| Mechanical Properties | |
| Flexural strength, GPA (Ksi)[c] | |
| Room temperature as fabricated | 1840 (267) |
| 316° C. as fabricated | 1199 (174) |
| 316° C. after 1500 thermal cycles[d] | 1303 (189) |
| Flexural modulus, MPa (Msi)[c] | |
| Room temperature as fabricated | 152.3 (22.1) |
| 316° C. as fabricated | 139.2 (20.2) |
| 316° C. after 1500 thermal cycles[d] | 82.7 (12.0) |
| Interlaminar shear strength, MPa (Ksi)[c] | |
| Room temperature as fabricated | 97.8 (14.2) |
| 316° C. as fabricated | 47.5 (6.9) |
| Shear modulus (G') (dyne/cm$^2$)[e] | |
| 25° C. | 8.8 E + 10 |
| 316° C. | 5.5 E + 10 |
| 400° C. | 3.3 E + 10 |
| Thermooxidative Stability | |
| Wt. loss after 1000 hours isothermal aging at 316° C. in air (%) | 6 |
| Thermal Cycling Properties | |
| Microcracks (cracks/inch) | |
| after 1000 thermal cycles[d] | 0 |
| after 1500 thermal cycles[d] | 1 |

[a]Determined by TMA
[b]Specimens immersed in water at room temperature for two weeks
[c]Average of three determinations
[d]Thermal Cycling temperature from −156° C. to 288° C.
[e]Measured by RDS

EXAMPLE 3

Following the procedure of Example 1, a PMR-P1 molding powder was prepared from a composition consisting of 11.81 g (0.031 mole) of BTDE, 8.96 g (0.045 mole) of MDA, 5.75 g (0.029 mole) of NE and 0.23 g (0.0009 mole) of N-phenylnadimide (PN). The PMR-P1 composition was formulated by adding a small quantity of PN into the standard PMR-15 composition. The addition of such a small quantity of PN significantly enhanced the resin flow properties of PMR-15. Thus, the PMR-P1 formulation is prepared, when the processing requires an improved flow resin matrix. A semi-IPN resin disc designated LaRC-RP30 was prepared from a mixture consisting of PMR-P1 and NR-150B2 in 80 and 20 weight percent, respectively. The resulting resin disc showed no voids, and had a density of 1.39 g/cc.

EXAMPLE 4

Following the procedure of Example 1, another improved flow thermosetting molding powder was prepared from a composition comprising 25.9 g (0.0673 mole) of BTDE, 19.7 g (0.0996 mole) of MDA, 12.6 g (0.0645 mole) of NE and 6.5 g (0.0361 mole) of monomethyl ester of phthalic acid. The molding powder exhibited improved flow properties when compared with the PMR-15 molding powder described in Example 1. The semi-IPN neat resin prepared from this improved flow molding powder and NR-150B2 in 80 and 20 weight percent, respectively, showed somewhat lower Tgs, when compared with LaRC-RP40 (Tgs of 312° C. and 326° C., as compared with 348° C. and 381° C.). Similarly, its composite reinforced with Celion 6000 graphite fibers and prepared as in Example 2 lower elevated temperature mechanical properties, as compared with the LaRC-RP40 counterpart. The room temperature and 316° C. interlaminar shear strengths were 13.9 and 8.3 Ksi, respectively. The room temperature and 316° C. flexural strengths and modulus were 233 and 94.5 Ksi and 16.0 and 8.2 Msi, respectively.

EXAMPLE 5

To study the relationships between processing and property, an advanced composite of LaRC-RP40 was prepared using five different sets of processing conditions. Process I has been described in Example 2. Processes II to V are described as follows:

Process II: 76.6 g of a PMR-15 monomer reactant mixture was dissolved in 76.6 g of methanol to give a 50 weight percent PMR-15 monomer solution. To this solution was added in one portion 31.35 g of NR-150B2 monomer precursor solution in ethanol (sold by DuPont under the trademark Avimid N S×6), which had a 61.1 percent solid content. The mixture was very viscous and difficult to stir using a stirring bar. Therefore, it was diluted with 29 g of methanol to give a 45 weight percent resin solution. As in Example 2, the resin solution was impregnated into graphite fibers. Unlike Example 2, which used unsized Celion 6000 graphite fibers, the fibers used here were unsized AS-4 graphite fibers. The prepreg exhibited excellent tack and drape characteristics. To improve the resin flow, the prepreg was B-staged at 204° C. for only one hour, instead of the two hours used in Example 2. The composite was cured and then postcured following the same cure cycle as that given in Example 2.

Process III: A 50 weight percent PMR-15 monomer solution was first applied to AS-4 graphite fibers to yield a prepreg containing 36 weight percent resin. The prepreg was staged at 204° C. for one hour. To the dried prepreg, the commercial Avimid N precoursor solution diluted with methanol to give a resin solution containing 20 weight percent solids was applied using a brush. The amount of the Avimid N resin was calculated to give an overall 45 weight percent resin content in the dried prepreg. After application of the Avimid N resin solution, the prepreg was dried further at 204° C. for one hour in air. The composite was processed as in Example 2.

Process IV: A 30 weight percent solution of Avimid N solution diluted with methanol was first applied to AS-4 graphite fibers to form a prepreg tape having a 22.5 weight percent resin content. The prepreg was dried at 204° C. for one hour in air and then impregnated with the same amount of a 30 weight percent PMR-15 monomer solution in methanol. The prepreg was further dried at 204° C. in air for one hour. As in Example 2, the composite was cured and postcured.

Process V: A prepreg was prepared following essentially the same procedure as that in Example 2. However, the prepreg was cured for one hour at 316° C. under 600 psi pressure, without further curing at 350° C. for one-half hour as was the case in Example 2. The composite was postcured at 316° C. for 16 hours.

The following Table 4 illustrates the effects of processing conditions on composite properties:

TABLE 4

| Composite Property | Process I | Process II |
|---|---|---|
| C-Scan | Good | Excellent |
| Tg, °C. | 369 | 298 |
| Flexural Strength, Ksi | | |
| 25° C. | 267 | 240 |
| 316° C. | 174 | 95 |
| Flexural Modulus, Msi | | |
| 25° C. | 22.1 | 13.0 |
| 316° C. | 20.2 | 9.6 |
| Shear Strength, Ksi | | |
| 25° C. | 14.2 | 12.7 |
| 316° C. | 6.9 | 6.8 |

What is claimed as new and desired to be secured by Letters Patent of the United States is:

1. A process for preparing a semi-interpenetrating polymer network which process comprises mixing an uncrosslinked, nadic endcapped polyimide prepolymer with a mixture of monomer precursors of a linear thermoplastic polyimide and allowing said prepolymer and monomer precursors to react randomly to form a simultaneous interpenetrating polymer network comprising a constituent high performance thermosetting polyimide having a nadic end group acting as a crosslinking site, and a constituent high performance linear thermoplastic polyimide having the following repeating unit:

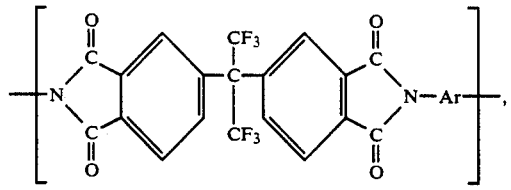

the constituent high performance thermosetting polyimide and the constituent high performance linear thermoplastic polyimides having comparable mechanical performance, thermo-oxidative stability, and glass transition temperatures (±50° C.), and being present in a weight ratio of 95:5 respectively to 5:95 respectively.

2. A molding compound comprising a semi-interpenetrating polymer network prepared by the process of claim 1.

3. An adhesive composition comprising a semi-interpenetrating polymer network prepared by the process of claim 1.

4. A polymer matrix composite comprising a semi-interpenetrating polymer network prepared by the process of claim 1.

* * * * *